No. 849,031. PATENTED APR. 2, 1907.
D. WARD.
ATTACHMENT FOR VEHICLE WHEELS.
APPLICATION FILED JAN. 21, 1907.

Witnesses
Edward W. Mohl
Georgiana Chace

Inventor
Dell Ward
By Luther V. Moulton
Attorney

UNITED STATES PATENT OFFICE.

DELL WARD, OF GRAND RAPIDS, MICHIGAN, ASSIGNOR OF ONE-FIFTH TO JOHN KELSEY AND ONE-FIFTH TO HENRY J. HERBERT, BOTH OF DETROIT, MICHIGAN, ONE-FIFTH TO JOSEPH R. TAYLOR, OF GRAND RAPIDS, MICHIGAN, AND ONE-FIFTH TO WALLACE W. JOHNSON, OF CHICAGO ILLINOIS.

ATTACHMENT FOR VEHICLE-WHEELS.

No. 849,031.   Specification of Letters Patent.   Patented April 2, 1907.

Application filed January 21, 1907. Serial No. 353,261.

*To all whom it may concern:*

Be it known that I, DELL WARD, a citizen of the United States of America, residing at Grand Rapids, in the county of Kent and State of Michigan, have invented certain new and useful Improvements in Attachments for Vehicle-Wheels; and I do hereby declare the following to be a full, clear, and exact description of the invention, such as will enable others skilled in the art to which it appertains to make and use the same.

My invention relates to improvements in attachments for vehicle-wheels; and its object is to provide a device that may be readily applied to any ordinary wheel for vehicles and when so applied that will provide the wheel with a spring-supported and yielding rim, and to provide the device with various new and useful features hereinafter more fully described and particularly pointed out in the claims, reference being had to the accompanying drawings, in which—

Figure 1:
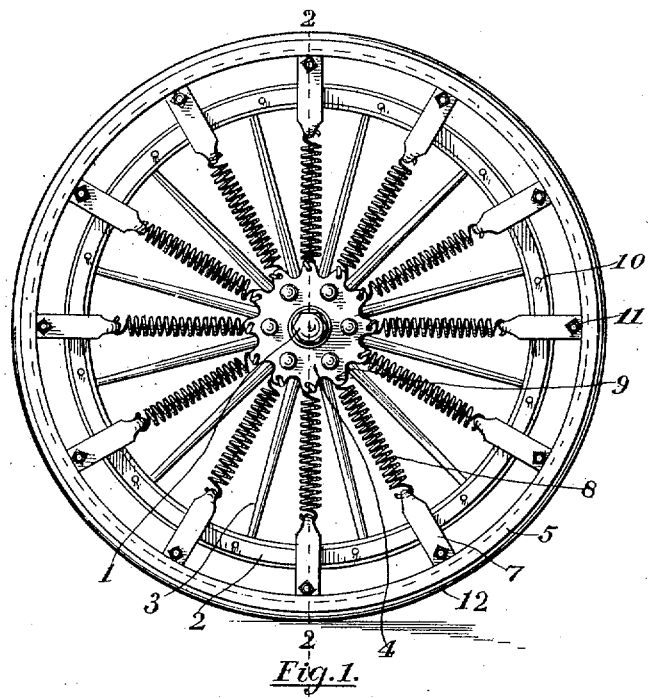
Figure 2:
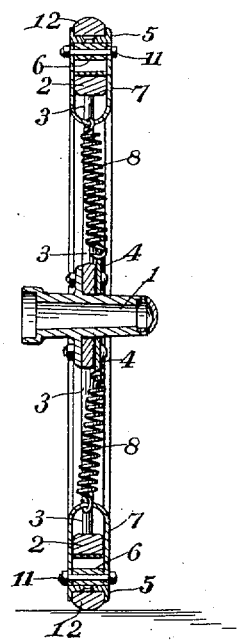
Figure 3:
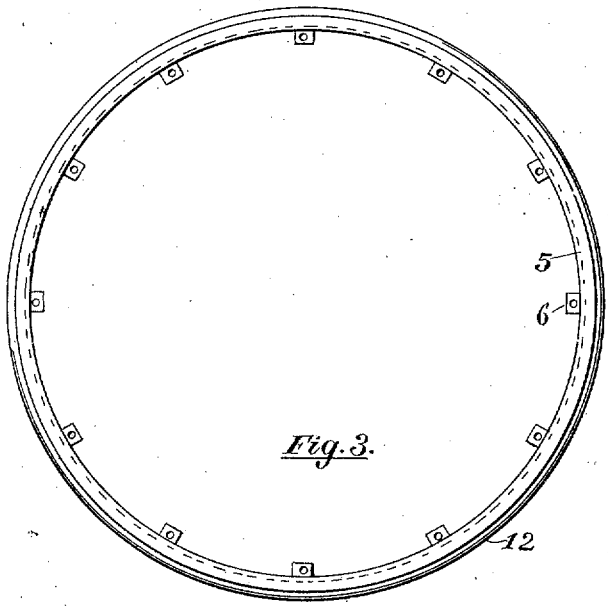
Figure 4:
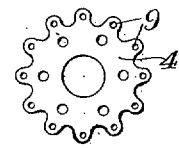
Figures 5, 6:
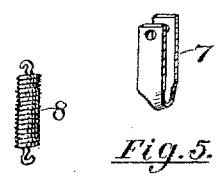

Figure 1 is an elevation of a wheel with my device attached thereto; Fig. 2, a vertical section of the same on the line 2 2 of Fig. 1; Fig. 3, a detail of the rim forming a part of my device; Fig. 4, a detail of the hub-plate to which the springs are attached; Fig. 5, a detail of one of the clips, and Fig. 6 a detail of one of the springs.

Like numbers refer to like parts in all of the figures.

1 represents the hub, 2 the rim, and 3 the spokes, of a vehicle-wheel, which wheel may be of any ordinary construction, the form shown being what is commonly known as the "artillery-wheel." The form of the wheel, however, is not material, as my device is adapted to be attached to any of the usual forms of wheels.

4 represents a disk or plate having a central opening to receive the outer end of the hub of the wheel, said disk being provided with marginal openings 9 for attachment of the radial springs 8. This disk when applied may either displace the outer disk or plate of the artillery style of wheel or may be placed on the outer end of the hub and in contact with the same or the outer flange or spokes of any other wheel as ordinarily constructed. In any event it is intended to be located somewhat outside the plane of the spokes, whereby the springs will be inclined to the plane of the wheel-rim for the purpose hereinafter mentioned.

The rim of my device, as shown, consists of a ring 5, preferably provided with a solid tire 12, of elastic material, and having inwardly-projecting lugs 6 attached thereto at regular intervals corresponding in number to the spokes of a wheel to which it is to be attached. Said lugs are perforated to receive the bolts or rivets 11 for securing the clips 7 in place, which clips consist of U-shaped members adapted to embrace the rim 2 of the wheel and permit the same to slide freely therein. The inner ends of these clips are reduced, and the springs 8 are provided with hooks at their respective ends and arranged radially midway between the spokes of the wheel, with one end attached to the plate 4 and the other end attached to the opposite clip 7. These springs are attached under tension and yieldingly hold the outer rim 5 spaced apart from the rim 2 of the wheel and concentric with the axis thereof.

The rim 2 of the wheel slides freely within the clips 7 and is held from rattling therein by the inclined arrangement of the springs, which tend to maintain contact between the rim 2 and one side of the clips 7. The rim 2 of the wheel is also freely rotative about its axis in the clips, but the springs tend to hold the same adjusted, so that the springs will be radial and the spokes of the wheel midway between the clips. This construction thus forms a yielding connection between the outer rim 5 and the wheel proper, whereby any sudden impulse is taken up by this rotary movement, thus neutralizing the intermittent or jerking motion of an engine in propelling a vehicle or sudden application of the clutch, as in automobile practice, which motion is unpleasant for the occupants of the vehicle and puts undue strains on the transmitting mechanism. To prevent the spokes from coming in contact with the clips, pins 10 are inserted in the wheel-rim 2, which pins limit the rotary movement of the wheel-rim in the clips by contacting the latter.

What I claim is—

1. A wheel attachment comprising a plate or disk having a central opening to receive the outer end of the hub of a vehicle-wheel, a ring to surround the rim of said wheel, clips to embrace said rim and slidably engage the same, means for attaching the clips and ring, and springs adapted to connect the disk and clips.

2. A wheel attachment comprising a ring to surround the rim of a vehicle-wheel and spaced apart therefrom, U-shaped clips to slidably embrace the rim of said wheel, means for attaching the clips to the ring, a central member adapted to engage the hub of the wheel, and contractile springs adapted to connect said clips to said central member.

3. In combination with a vehicle-wheel, a central member attached to the hub of the wheel, clips slidably embracing the rim of the wheel, a ring surrounding the rim of the wheel and spaced apart therefrom, means for attaching the clips to the ring, and springs connecting the central member and the clips.

4. In combination with a vehicle-wheel, a disk having a central opening to receive the outer end of the hub and attached to the hub outside the plane of the rim of the wheel, clips embracing and slidably engaging the rim of the wheel, a ring surrounding the rim of the wheel and spaced apart therefrom, means for attaching the clips to the ring, and contractile radial springs arranged inclined to the plane of the rim and ring, said springs being attached at one end to the clips and at the other end attached to the disk.

5. In combination with a vehicle-wheel, a disk having a central opening to receive the outer end of the hub of the wheel and marginal openings to receive the ends of the springs, a ring to surround the wheel-rim and spaced apart therefrom, lugs on the inner side of the ring and having bolt-openings, U-shaped clips slidably embracing the wheel-rim and bolted to the lugs, and springs having hooks at their respective ends to engage the openings in the disk and the inner ends of the clips.

In testimony whereof I affix my signature in presence of two witnesses.

DELL WARD.

Witnesses:
GEORGIANA CHACE,
L. V. MOULTON.